July 9, 1935.　　　J. C. SHAW ET AL　　　2,007,899
TRACER
Filed Jan. 5, 1933　　　2 Sheets-Sheet 1
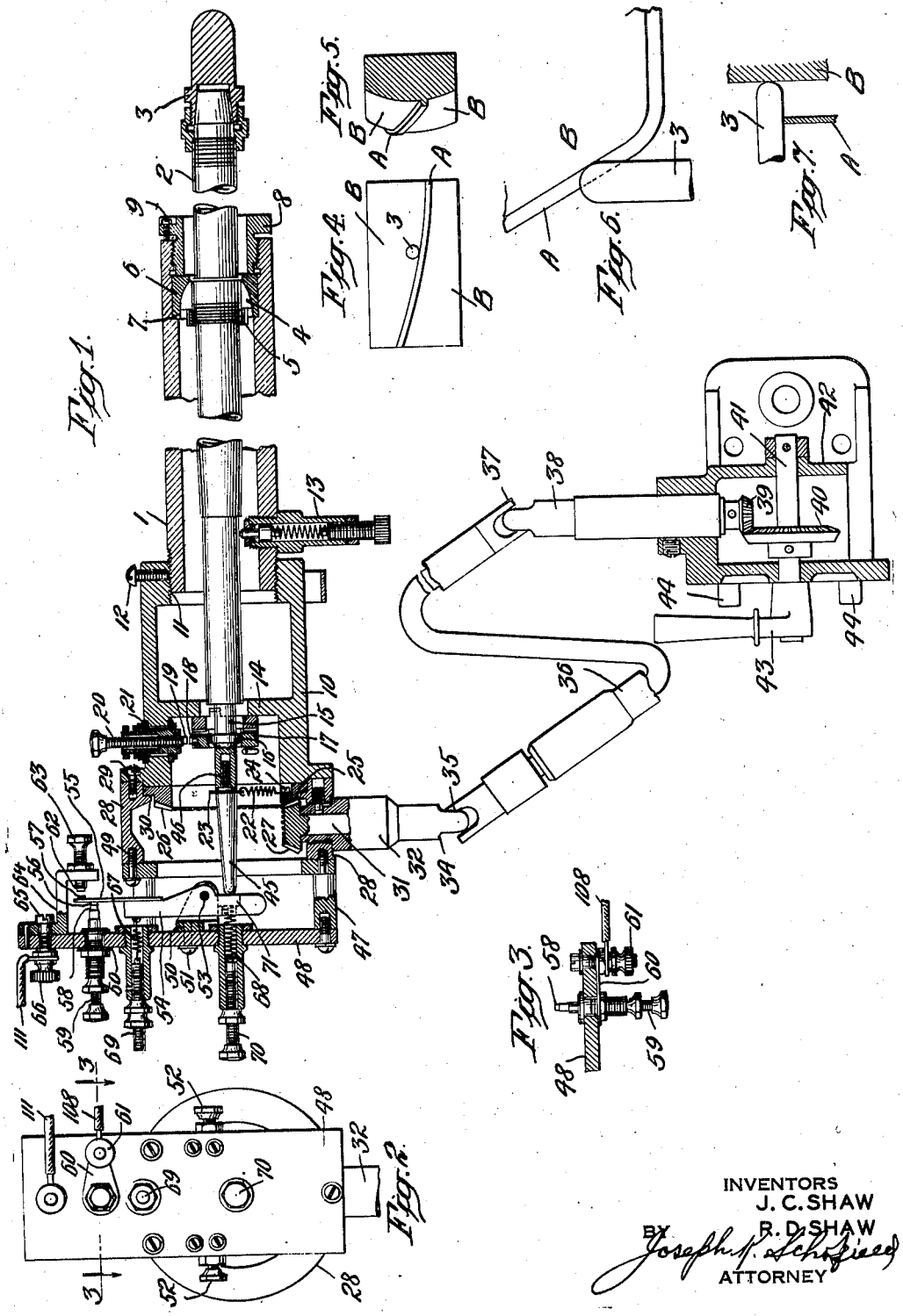
INVENTORS
J. C. SHAW
R. D. SHAW
BY Joseph F. Schofield
ATTORNEY

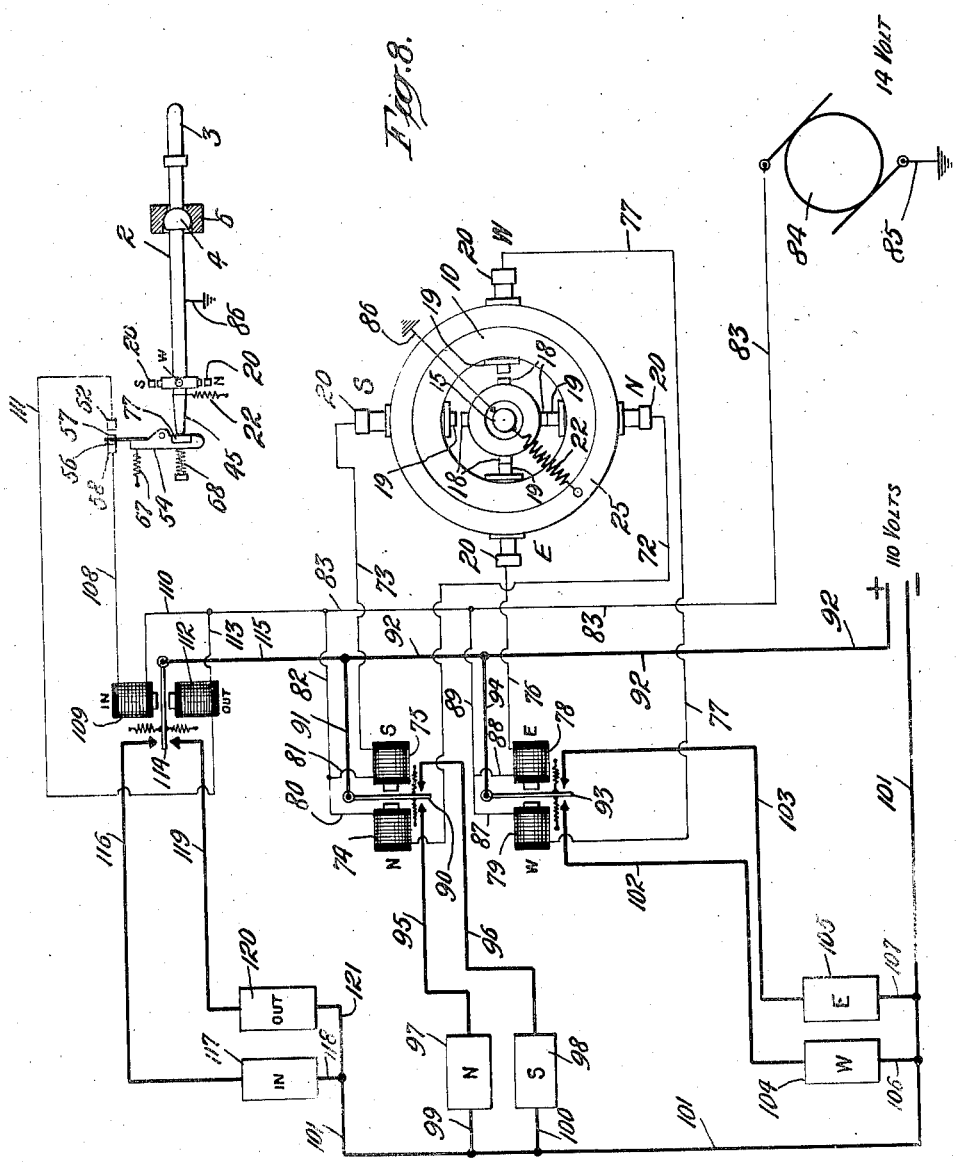

UNITED STATES PATENT OFFICE 2,007,899

TRACER

John C. Shaw and Robert D. Shaw, Hartford, Conn., assignors to Pratt & Whitney Company, Hartford, Conn., a corporation of New Jersey Application January 5, 1933, Serial No. 650,360

12 Claims. (Cl. 90—62)

This improvement relates to a combination contouring and depth governing tracer and more particularly to means for converting the well known Keller contouring tracer into a combination tracer adapted to govern the depth of cut or the in and out position of the tracer as it follows the contour of a profile pattern on a curved surface.

Die sinking machines of the Keller type, based on Shaw Patent No. 1,506,454 and now well known in the trade, may be used with either a contouring tracer or with the standard automatic three-dimensional tracer substantially as described in Shaw Patent No. 1,683,581 of September 4, 1928. The latter patent, which shows and describes both forms of tracers, describes (page 11, lines 88 to 98) how the contouring tracer may be used for three-dimensional work, but in the operation described, the control of the depth or third dimension is entirely manual and the operation becomes a succession of profiling cuts of step-by-step formation at successively increased depth.

The Keller standard form of tracer for three-dimensional work, which is shown and described in the above mentioned Shaw Patent No. 1,683,581, while controlling the operation of the machine from a three-dimensional pattern in cutting various forms of dies, is not particularly adapted for profiling work, such work being more efficiently done by the contouring tracer.

The contouring tracer is not, however, adapted for, nor is it capable of automatically controlling the depth of cut as the tracer follows the contour of a profile template or pattern. When reproducing the contour of a profile pattern, where the profile represents a bead or similar outstanding device on a curved surface, or where it is desired to vary the depth of cut around the profile, the standard type of three-dimensional tracer could be used, but while capable of reproducing most any kind of work from a suitable pattern, in profile work it would require more time and be less efficient than a contouring tracer, and the latter will reproduce any profile more accurately, without leaving feed lines or fillets.

One object, therefore, of the present invention is to produce a combination contouring and depth governing tracer embodying all the advantages of the contouring tracer for speed and accuracy of reproduction of a profile, with automatic control of the depth of cut. That is, the in and out position of the cutter is automatically determined so that profiles of irregular depth, or profiles formed upon irregular or curved surfaces may be automatically reproduced.

A further object of the invention is to produce an attachment to, or suitable means for converting a standard contouring tracer into a combination tracer adapted for efficient, simultaneous, three-dimensional and contouring operations. This object may be accomplished by reversing the ball and socket so as to provide for both universal oscillatory or wobbling and longitudinal movements thereof. In addition to the contouring tracer contacts, the opening and closing of which are controlled by the wobbling or oscillatory movements of the tracer bar, there are added front and back depth governing contacts, substantially the same as the front and back contacts of the three-dimensional standard tracer. These are adapted to be opened and closed by longitudinal movements of the tracer bar only to control the in and out positions of the tracer and cutter.

In the standard automatic three-dimensional tracer either wobbling or longitudinal movement of the tracer bar effects opening and closing of the front and back contacts mounted on the contact carrying lever. In the present instance, however, the wobbling movements of the tracer are not utilized for this purpose, but only, as in the contouring tracer, for opening and closing the contouring tracer contacts. The wobbling movements of the tracer are rendered ineffective to operate the front and back contacts by providing the tracer operated arm of the contact carrying lever with a substantially flat surface or buttton for cooperation with the rounded end of a finger extension, axially of the usual contouring tracer bar. This arrangement permits the usual wobbling movements of the tracer bar for effecting contouring operations, but these movements will not operate the contact carrying lever to open and close the front and back contacts, the latter, as previously explained, being opened and closed only by longitudinal movements of the tracer bar to control respectively the in and out or depth governing movements of the tracer.

One form of this novel combination contouring and depth governing tracer is shown in the accompanying drawings in which Fig. 1 is a longitudinal section; Fig. 2 is an end view looking from the left end of Fig. 1; Fig 3 is a small sectional detail on the line 3—3 of Fig. 2; Figs. 4, 5, 6 and 7 are diagrams of pattern and tracer illustrating the operation of the tracer and Fig. 8 is a wiring diagram of circuits for the tracer, relays and magnetic clutches.

The present improvement, therefore, provides a body portion 1, in which a tracer bar 2, carrying the tracer point 3, is mounted for both wobbling or universal lateral movements and for longitudinal movements. In the contouring tracer shown in Patent No. 1,683,581, the tracer bar is supported in the body portion by a hemispherical socket bearing, the open end of which is outward or toward the model contacting end of the tracer bar, so that backward longitudinal movement of the tracer bar from its seat is not permitted. In order to provide for longitudinal movements as well as the wobbling or lateral movements, the tracer bar 2, in the present instance, is provided with a substantially hemispherical collar 4 held in place by a screw-threaded nut 5 and supported in a hemispherical socket bearing 6, the larger open end of which is inward or away from the tracer point 3. In addition, the socket 6 is provided with a cylindrical portion at 7 fitting a recess formed in the body member 1. This bearing socket 6 is held in place by the usual screw threaded thimble 8, which may be locked in place by the screw 9. The opposite or head end of the body portion 1 is provided with an enlarged section 10, preferably mounted on the bearing section by being screw-threaded at 11 and held in proper register therewith by a set screw 12.

A counterbalancing device is shown at 13 in the form of a spring normally forced against the bar 2.

The enlarged end 10 of the body portion is preferably provided with a partition 14, having a central opening through which the reduced end 15 of the tracer bar passes, as shown in Fig. 1. The end 15 of the tracer bar is provided with a collar 16 supporting an annular contact carrying member 17, provided with four contacts 18, 90° apart and arranged to cooperate with four circumferentially arranged, inwardly projecting fixed contacts 19 mounted in the front part of the body section 10 and equally spaced circumferentially of the tracer bar.

The fixed contacts 19 are mounted on adjusting screws 20, which are supported by suitable insulated bushings 21, the respective contacts having wiring connections to the usual magnetic clutches for controlling the two contouring motions, substantially as shown in the wiring diagram of Fig. 8, and described in the hereinbefore mentioned patents.

The magnetic clutch circuits for the respective contouring tracer feeds are closed by closing one or the other of the four contacts 18 on the tracer bar, with the corresponding contact 19 on the body portion and these contacts, as previously explained, are closed only by wobbling or lateral movements of the tracer bar 2, as the tracer follows the contour or peripheral edge of a profile pattern.

A spring 22, or other suitable resilient member, is connected with the inner end of the tracer bar at 23; the opposite end of the spring being connected at 24 with a rotatable selector ring 25 for selecting the contacts to be normally resiliently closed. In the present instance, the ring 25 is provided with bevel gear teeth 26 meshing with the teeth of a bevel pinion 27 supported in an annular guard ring 28 secured by suitable screws 29 to the body section 10. The guard ring 28 is provided with an inwardly projecting annular flange 30 which serves as a bearing support for the rotatable selector ring 25 and holds it in place.

Obviously, the selector ring 25, supporting the outer end of the radially arranged spring 22, may be rotated in any suitable manner, but for the larger machines, it is preferable to provide the gear and pinion drive, 26 and 27, and connect the pinion 26 with a flexible shaft and handle member for distant control. Accordingly, the pinion shaft 31 is mounted in a bearing collar 32 secured to the guard ring 28 in any suitable manner. As indicated in Fig. 1, the outer end 34 of the pinion shaft is connected by a suitable universal joint 35 with an interconnecting telescoping shaft 36, the latter being connected through a universal joint 37 with the shaft 38 of a bevel pinion 39, meshing with a bevel gear 40, mounted on a shaft 41, rotatably supported in a frame 42.

The outer end of the shaft 41 is provided with the usual pointer handle 43, for rotating the gear 40, and, through shaft 36 and pinion 27, the selector ring 25 and resilient member 22, the position of which may be readily determined by suitable indices 44 arranged in opposite quadrants on the face of the supporting frame 42.

Also in the present instance the bearing socket 4—6 has been reversed and arranged to permit backward movement of the tracer bar from the position shown so as to provide for operating the depth governing contacts.

While the combination tracer is here shown as a complete instrument, it will be understood that the depth governing feature may be considered substantially as an attachment for the standard contouring tracer. To make this conversion, the reduced end 15 of the contouring tracer bar 2 is extended axially by means of a round ended finger 45, screw threaded at 46 and screwed into the end of the tracer bar in place of the screw which ordinarily is provided for holding the link 23 for supporting the inner end of the spring 22.

In order to support the depth governing circuit controlling contacts in position for operation by longitudinal movement of the tracer finger, a frame 47, having an outer plate 48, is secured by suitable screws 49 to the contouring tracer guard ring 28 which, as described, is mounted on the end of the body section 10, substantially as shown in Fig. 1.

The supporting plate 48 for the depth governing portion of the combination tracer corresponds substantially with the front plate of the automatic three-dimensional electric tracer as shown and described in Shaw Patent No. 1,683,581. In the present instance, a yoke bracket 50 is secured by suitable screws 51 to the frame plate 48 and this bracket is provided with pivot supporting screws 52 cooperating with a lever pivot 53 in supporting the contact carrying lever 54.

The contact carrying lever 54 is, in the form here shown, provided with a leaf spring resilient member 55 carrying at its upper end both a front contact 56 and a back contact 57. The front contact 56 is arranged to cooperate with a fixed contact 58 on the end of an adjusting screw 59, suitably supported in an insulating bushing in the plate 48. The contact carrying screw 59 is preferably connected by a strip 60 (Fig. 2) with a binding screw terminal 61, to which the magnetic clutch relay circuit is connected for controlling the in motion of the tracer and cutter as hereinafter described.

The back contact 57, on the lever member 55, is arranged to cooperate with a clutch circuit contact 62 on the end of an adjusting screw 63, supported in an angular bracket 64 secured to the front plate 48 by a screw 65 which, by means of a thumb nut 66, serves as a binding screw terminal to which the relay circuit of the out magnetic clutch is secured as hereinafter described (see Fig. 8). The bracket 64 and screw 65 are suitably insulated from the plate 48.

Preferably a tension spring 67 and compression spring 68 cooperate to actuate the contact carrying lever 54 and to normally maintain the front contacts 56, 58 in closed circuit. Suitable adjusting screws and nuts 69 and 70 are provided for adjusting the tension of the respective springs 67 and 68. The tracer, including the tracer bar and tracer body, is grounded to complete the circuit, as indicated in Fig. 8.

The movements of the contact carrying lever 54 are controlled by longitudinal movements of the tracer bar 2, the arrangement being such that the finger 45 on the end of the tracer bar engages the short arm of the lever which is preferably provided with a hardened button or block 71 mounted upon or inserted in the contact carrying lever 54 below the pivot 53. By this arrangement it will be seen that the action of the springs 67 and 68 is to thrust the button 71 against the end of the finger 45, thereby holding the hemispherical bearing member 4 in its socket 6 and at the same time holding the front contacts 57—58 closed, except when the tracer bar is displaced longitudinally by pressure on the end of the tracer 3.

In the standard three-dimensional tracer (Patent No. 1,683,581) the contact carrying lever, corresponding to the lever 54, is provided with a conical socket member cooperating with the end of the tracer bar so that both wobbling and longitudinal movement of the latter will operate the contact lever. In the present instance, however, the conical socket is replaced by the flat faced button 71 or one having a concave spherical surface of large radius. By this connection wobbling movements of the tracer bar 2 will not move the contact carrying lever 54, and opening and closing of the front and back contacts is controlled only by longitudinal movements of the tracer bar. Obviously, since the tracer bar 2 wobbles about in the socket bearing 4—6 as a fulcrum, the surface of the button 71 should theoretically be spherical, with the fulcrum point as the center, but the wobbling motion of the tracer bar is relatively so small that for practical purposes, the surface of the button 71 may be substantially flat.

In the wiring diagram of Fig. 8, the contouring contacts and operating portions of the combination tracer are given the corresponding previously used reference numbers and for clearness the tracer bar and depth governing portion are shown separately but, as will be understood, the circuits are all operated from the same source. The circumferentially arranged contouring contacts 19 on the body portion 10 are preferably designated N, S, E and W, representing the cardinal points which are used to designate the directions of the motions. The designations are oppositely placed around the tracer head because North movement of the tracer 3 means downward movement of the other end 15 of the tracer bar 2.

The North and South contact screws 20 are connected by low voltage control circuits 72 and 73 with relay magnets 74 and 75, designated respectively N and S. The E and W contact screws 20 are similarly connected by low voltage control circuit leads 76 and 77 with relay magnets 78 and 79 designated respectively E and W. The circuits of the respective relay magnets 74 and 75 are completed through leads 80 and 81 to lead 82, which in turn is connected with lead 83, connected with one terminal of the 14 volt generator 84 for the control circuits, the other side of the circuit being connected to ground by lead 85.

It has been previously pointed out that the tracer bar 2—15 is grounded as indicated at 86 so that the respective relay circuits are completed back to the generator 84.

The W and E relay magnets 78 and 79 are similarly connected to lead 83 by leads 87, 88 and 89. The N and S magnets 74 and 75 are arranged to actuate a two-way swinging armature 90 (normally centralized by springs) connected in the higher voltage (110 volts) operating circuit by lead 91, which in turn is connected with lead 92, designated as the plus side of the 110 volt circuit.

Similarly the W and E magnets 78 and 79 are arranged to actuate a two-way swinging armature 93 (normally centralized by springs) connected by lead 94 with the lead 92 or plus side of the 110 volt circuit.

The N and S armature 90 is, therefore, adapted to close the higher voltage operating circuit through leads 95 or 96 to the respective magnetic clutches 97 or 98, designated N and S. These clutches, as will be understood in the operation of the Keller machine tools, are adapted for effecting the vertical or up and down motions of the tracer and cutter. The circuits of magnetic clutches 97 and 98 are completed through leads 99 and 100, to lead 101 representing the negative side of the 110 volt circuit.

Similarly the armature 93 of the W and E relay magnets 78 and 79 is adapted to close a clutch operating circuit through the leads 102 or 103 to the respective magnetic clutches 104 or 105, designated as W and E, which in the operation of the Keller machine are for longitudinal motions and move the tracer and cutter to the right (E) or to the left (W). The operating circuits for magnetic clutches 104 and 105 are completed by leads 106 and 107 to the lead 101 representing the negative side of the 110 volt circuit.

The rotatable resilient member or spring 22, which normally is adapted to close the contouring tracer contacts 18 and 19, as previously pointed out, is adapted to close on only two contacts, on one side of the tracer bar, that is, on the side of and in the line of action of the spring. In Fig. 8, the ring 25 is turned so that the spring 22 is in position to close the contacts of circuits N and E, the S and W circuits being open.

Longitudinal movements of the tracer bar 2 by engagement of the tracer with the pattern, and the finger 45 pressing against the flat surface 71 of the operating arm of the contact carrying lever 54, are adapted to open and close the front and back contacts 56—58 and 57—62, for the in and out motions of the tracer and cutter, substantially as described in Shaw Patent No. 1,683,581. In the present instance, wobbling movements of the tracer bar have no effect in the control of in and out motions, as the operation of the contact carrying lever 54 is effected by the longitudinal movements of the tracer bar in any oscillated position of the tracer. Wobbling or lateral movements of the tracer bar control the usual contouring motions which are brought into operation only by closing the contouring tracer contacts N, S, E and W.

As previously pointed out, in the depth governing attachment the springs 67 and 68 normally maintain the contacts 56—58 closed for in motion, the fixed contacts 58 being connected, in the low voltage or control circuit, by lead 108 to relay magnet 109 designated "in". The circuit from the "in" magnet 109 is completed by lead 110 to lead 83 and thence to the 14 volt generator 84, which as previously described, is grounded at 85, thus completing the circuit to the tracer bar which is grounded at 86.

The depth governing back contact 57—62 is adapted to close the tracer grounded circuit through lead 111 to relay magnet 112, designated "out", the circuit being completed through lead 113 to lead 83 and back to the 14 volt generator 84 and to ground 85 as previously described. A two-way swinging armature 114, centralized by springs and operating between the relay magnets 109 and 112 is connected by lead 115 with lead 92, which represents the positive side of the clutch operating 110 volt circuit.

According to this arrangement, actuation of the armature 114 by the "in" relay magnet 109 closes the circuit through lead 116 to the magnetic clutch 117, designated "in" for in motion, the circuit being completed through lead 118 to lead 101, representing the negative side of the clutch operating 110 volt circuit.

Similarly, operation of the armature 114 by the "out" relay magnet 112 completes the circuit through lead 119 to magnetic clutch 120, designated "out", the circuit being completed through lead 121 to lead 101, representing the negative side of the 110 volt circuit.

It will thus be seen that the in and out depth governing motions and the position of the tracer and cutter for the depth of cut are controlled by operation of the magnetic clutches 117 and 120 through the opening and closing of the front and back tracer contacts 56—58 and 57—62 and the opening and closing of these contacts is controlled only by longitudinal movements of the tracer bar 2. The finger 45 cooperating with the flat surface 71 permits the wobbling movements of the tracer bar to be used solely for controlling the opening and closing of the contouring tracer contacts 18, 19, for N, E, S and W motions, as previously explained.

The operation of the combination tracer, merely as a contouring tracer following the edge of a template of the usual form, will be substantially the same as with the standard contouring tracer. But when the profile to be reproduced varies in depth, or extends over a curved or wavy surface the depth governing feature of the present improvement is brought into action to vary the position of the cutter as the tracer follows a suitable curved or depth governing pattern, arranged for cooperation with the template or pattern representing the profile to be reproduced by the contouring tracer, or upon which a bead or profile is mounted.

The combination tracer is particularly adapted for the character of work shown in Figs. 4 and 5, where a curved form of pattern is shown with a bead projecting therefrom. It will be noted that as the tracer 3 follows the profile of the bead A, the point of the tracer will come in contact with the curved surface B of the pattern and as a result of longitudinal movements of the tracer bar 2 the contacts 56—58 and 57—62 controlling the magnetic clutches will gradually work the tool around the curve and form a bead of uniform depth on the curved surface. Simultaneously during this operation the contouring tracer contacts 18 and 19 under the action of spring 22 are being closed and opened according to the directions of motions required, the directions being controlled by the position of the spring 22. The position of the spring 22, as previously pointed out, is controlled by the handle 43 in cooperation with the position indicating indices 44 (Fig. 1).

In the combination tracer as herein described, the wobbling movements of the tracer cannot control the in and out position of the cutter when the angle between the axis of the tracer point and the pattern is relatively great. For instance, as will be seen in Fig. 6, an excessive angle from the perpendicular will fail to produce the required longitudinal movement of the tracer bar to operate the contact carrying lever 54, the tracer oscillating instead of moving backward. Hence, the form of combination tracer illustrated can be used only to follow a pattern where the angle of the tracer to the surface is less than approximately 45°. If the angle is about 45° or more, the end pressure for axial movement of the tracer bar will not be sufficient to operate the contact carrying lever 54 to open or close the contacts for the in and out motions.

Fig. 7 indicates how the combination tracer can be used to follow a depth governing model and at the same time follow the outline of a contour template superimposed thereon, this arrangement being suitable for the reproduction from the same outline of work pieces of different thickness or with walls of different depths.

The combination tracer, therefore, combines in a single instrument both the standard contouring tracer and the essential feature of the automatic tracer, that is, control of the in and out motions for governing the position of the cutter, thereby increasing both the speed and accuracy of reproduction and eliminating the necessity for accurate adjustments when work of this character is required to be reproduced. Such work can be done by using one or both types of standard tracers, but the trouble and accuracy of setting involved is likely to be prohibitive.

It will be understood that the preferred form of the combination tracer is here shown and described, but obviously, various changes in the specific construction and arrangement of the controls for the several circuits may be made without departing from the spirit and scope of the invention.

What we claim is:

1. A combination contouring and profiling tracer comprising in combination, a body member, a universally oscillatory and longitudinally movable tracer bar therein, contacts opened and closed by oscillatory movements of said bar, and contacts opened and closed by longitudinal movement of said bar, said latter contacts being opened and closed with the bar in any oscillated position.

2. A combination contouring and profiling tracer comprising in combination, a body member, a universally oscillatory and longitudinally movable tracer bar therein, contacts opened and closed by oscillatory movements of said bar in any longitudinal position of said bar, and contacts opened and closed by longitudinal movement of said bar in any oscillated position of said bar.

3. A combination contouring and depth governing tracer comprising, a tracer bar mounted for both oscillatory and longitudinal movements, contouring circuit closing contacts equally spaced circumferentially of said tracer bar, the opening and closing of which is controlled by said oscillating movements thereof, and depth governing circuit closing contacts, the opening and closing of which is controlled by said longitudinal movements of the tracer bar.

4. A combination contouring and depth governing tracer comprising, a tracer bar mounted for both oscillating and longitudinal movements, contouring circuit closing contacts arranged in opposite quadrants circumferentially of said tracer bar, said contouring circuits being opened and closed by said oscillating movements of the tracer bar, and depth governing circuit closing contacts opened and closed by said longitudinal movements of the tracer bar in any oscillated position of said tracer bar.

5. A combination contouring and depth governing tracer comprising, a tracer bar mounted for universal oscillatory and longitudinal movements, four circuit closing contacts equally spaced circumferentially of said tracer bar, the opening and closing of which are controlled by said lateral movements of said tracer bar as the tracer follows the contour of a pattern, and depth governing circuit closing contacts, the opening and closing of which is effected by longitudinal movements of the tracer bar as the tracer follows a depth governing pattern.

6. A combination contouring and depth governing tracer comprising, a tracer bar mounted for universal lateral movement, circuit closing contouring tracer contacts equally spaced circumferentially of said tracer bar, opposite circuit contacts being in opposite quadrants, a rotatable resilient member arranged to move said tracer bar laterally for closing contacts in adjacent quadrants, means for mounting said tracer bar for longitudinal movements axially, a contact carrying lever having front and back circuit closing contacts arranged to be opened and closed by said longitudinal movements of the tracer bar, means for resiliently holding the tracer bar in such position axially that said front contact is normally closed, and engaging means between said lever and the tracer bar whereby opening and closing of said front and back contacts may be effected in any oscillated position of said tracer bar.

7. A combination contouring and depth governing tracer comprising, a tracer bar, contouring circuit closing contacts arranged circumferentially of said tracer bar, opposite circuit contacts being in opposite quadrants, magnetic clutches, the circuits of which are adapted to be opened and closed by said contouring contacts as the tracer follows a contour pattern, means for mounting said tracer bar for both universal lateral and longitudinal movements, said contouring contacts being arranged to be opened and closed by lateral movements of the tracer bar, depth governing circuit closing contacts arranged to be opened and closed by longitudinal movements of said tracer bar, and magnetic clutches for in and out motions, the circuits of which are controlled by the opening and closing of said depth governing contacts as the tracer follows a depth governing pattern.

8. A combination contouring and depth governing tracer comprising a body portion, a tracer bar supported in said body portion for universal lateral and longitudinal movements, four circuit terminal contacts disposed about the tracer bar and mounted on said body portion and equally spaced circumferentially, four cooperating contacts carried by said tracer bar for closing the respective circuits of the terminal contacts by lateral movements of said tracer bar as the tracer follows the contour outline, a rotatably supported resilient member connected with said tracer bar and rotatable thereabout for urging the closing of two adjacent contacts according to the line of action of said resilient member, an auxiliary frame for depth governing contacts secured to the end of said portion, circuit terminal contacts on said frame and a lever having front and back contacts mounted for cooperation with said frame contacts, said lever being fulcrumed on a pivot transversely of said tracer bar and provided with a substantially flat hardened surface cooperating with an axial extension on said tracer bar for rocking said lever for opening and closing said depth governing contacts by longitudinal movements of the tracer bar.

9. A combination contouring and depth governing tracer comprising a body portion, a tracer bar carrying a tracer at its outer end, means for mounting the tracer bar in said body portion for universal lateral and longitudinal movements, four terminal contacts for magnetic clutch circuits mounted on said body portion and equally spaced circumferentially of the tracer bar, four corresponding circuit closing contacts carried by the tracer bar for closing the respective magnetic clutch circuits by lateral movements of said tracer bar as the tracer follows the contour of a pattern, a contact carrying lever pivotally supported by said body portion for movement in the plane of said tracer bar, a finger at the inner end of the tracer bar engaging said lever for moving the latter by longitudinal movements of the tracer bar as the tracer follows a depth governing pattern, terminal contacts on said frame for magnetic clutch circuits for in and out depth governing motions, circuit closing contacts on said lever for cooperation with the contacts on said frame, and resilient means for maintaining the in contact normally closed and said lever in contact with the tracer bar finger.

10. A combination contouring and depth governing tracer comprising a body portion, a tracer bar mounted in said body portion for universal lateral and longitudinal movements, four terminal contacts equally spaced circumferentially of said tracer bar for controlling the circuits of magnetic clutches for contouring motions, four equally spaced contacts carried by said tracer bar for engaging the first named contacts and closing the respective magnetic clutch circuits, a rotatable radially acting resilient member connected with the tracer bar for urging the closing of said contacts in the direction of pull of said resilient member, a contact carrying lever pivotally supported by said body portion for movement in a plane at right angles to the plane of said contouring contacts, front and back contacts on said lever, contacts for magnetic clutch circuits controlling in and out motions supported by said body portion for cooperation with said front and back contacts and cooperative means between said lever and the tracer bar whereby longitudinal movements of the latter are effective for opening and closing said lever contacts under the control of a depth governing pattern as the tracer follows the contour of a profile pattern.

11. A depth governing attachment for contouring tracers wherein a universally oscillatory tracer bar carries contacts cooperating with contouring tracer contacts arranged circumferentially of the tracer bar, comprising means for mounting said tracer bar for longitudinal movements in addition to said oscillating movements, a finger mounted on the end of said contouring tracer bar, a contact carrying lever having a flat surface cooperating with said finger, the cooperation being such that oscillating movements of the tracer bar do not cause movement of said lever, movements of the lever being effected only by longitudinal movements of said tracer bar, and cooperating circuit closing contacts arranged to be opened and closed by said lever by longitudinal movements of the tracer bar.

12. A depth governing attachment for contouring tracer having a body portion supporting a tracer bar normally mounted in a hemispherical socket bearing permitting universal oscillatory movements for opening and closing contacts arranged circumferentially of the tracer bar for controlling magnetic clutch circuits, comprising a rearranged hemispherical socket bearing permitting both oscillatory and longitudinal movements of the tracer bar, a head frame secured to and lengthening said body portion, a lever carrying front and back contacts pivotally supported in said frame for movement in the plane of the tracer bar, an operating arm on said lever provided with a substantially flat operating surface, a finger secured to the end of the contouring tracer bar and extending into said frame for cooperation with the flat surface of said arm, said flat surface permitting oscillatory movements of the tracer bar without operating the lever to open and close said lever contacts, said lever contacts being opened and closed only by longitudinal movements of the tracer bar, and resilient means controlling longitudinal movements of the tracer bar and the opening and closing of said lever contacts.

JOHN C. SHAW.
ROBERT D. SHAW.